March 16, 1943.                O. S. CARLISS                    2,314,321
              BEARING CONSTRUCTION FOR FORCE MEASURING APPARATUS
                    Original Filed Dec. 14, 1940    2 Sheets-Sheet 1
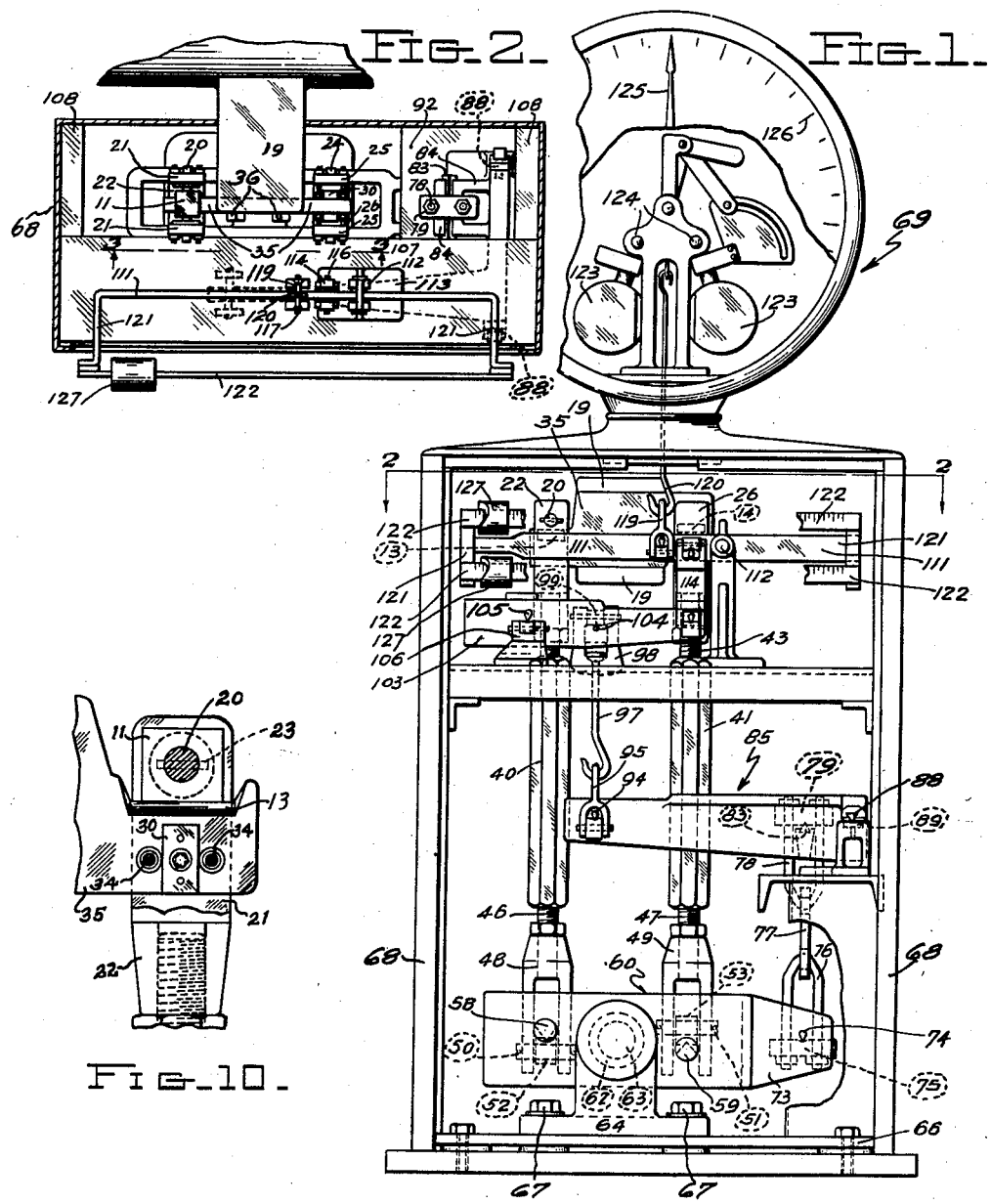
INVENTOR
Oswald S. Carliss,
BY
ATTORNEY March 16, 1943. O. S. CARLISS 2,314,321
BEARING CONSTRUCTION FOR FORCE MEASURING APPARATUS
Original Filed Dec. 14, 1940 2 Sheets-Sheet 2
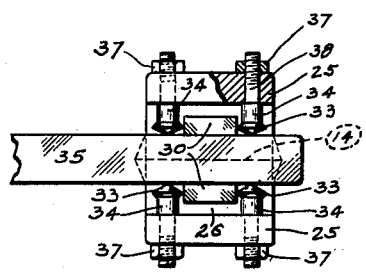
Fig. 7.
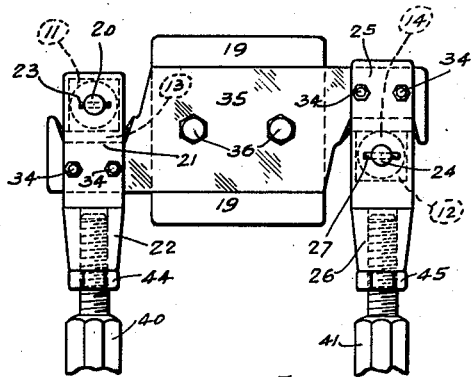
Fig. 3.
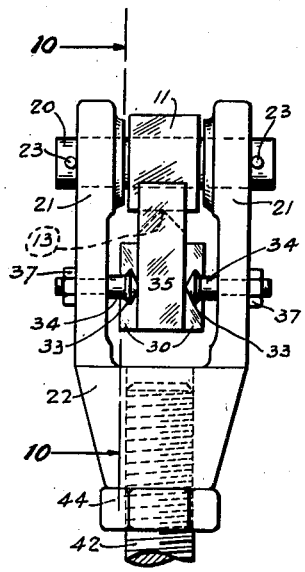
Fig. 6.
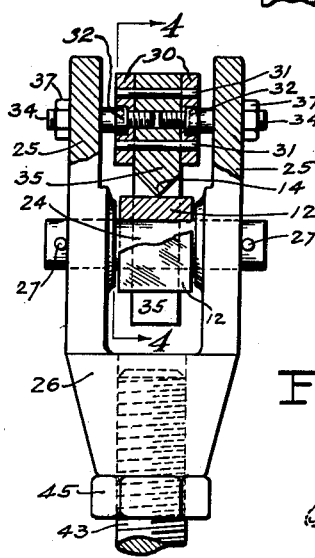
Fig. 5.
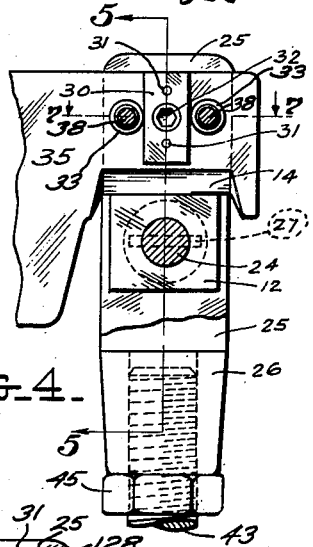
Fig. 4.
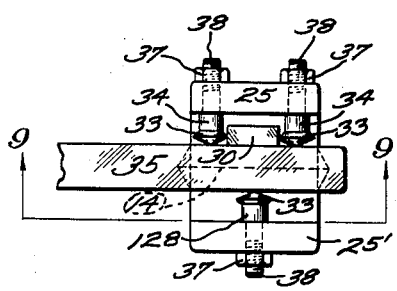
Fig. 8.
Fig. 9.
INVENTOR
Oswald S. Carliss
BY
ATTORNEY Patented Mar. 16, 1943

2,314,321

UNITED STATES PATENT OFFICE 2,314,321

BEARING CONSTRUCTION FOR FORCE MEASURING APPARATUS

Oswald S. Carliss, Fairfield, Conn., assignor to The Kron Company, Bridgeport, Conn., a corporation of Connecticut Original application December 14, 1940, Serial No. 370,097. Divided and this application July 14, 1941, Serial No. 402,312

14 Claims. (Cl. 308—2)

This invention relates to direction converting mechanism particularly suited for transmitting load forces both of a pulling and of a thrusting nature in the operation of counterbalancing and measuring the magnitude of load forces which may be exerted sometimes in one direction and sometimes in the opposite direction, as by the torque arm of a dynamometer.

A force measuring and indicating apparatus particularly designed for use in this connection is fully illustrated and described in my copending application, Serial No. 370,097, filed Dec. 14, 1940, from which the present application is divisional.

In order to care for the special condition of load application wherein a load, such as the torque exerted by a dynamometer arm, may exert its force upon a common automatic counterbalancing and measuring mechanism in a constant direction while originating in either an upward or downward direction, a direction converting transmission may be employed involving a frame fulcrumed lever and two upright coupling rods.

An object of the improvement herein claimed is to reduce operating friction and eliminate objectionable wear and looseness between relatively moving pivotally coupled parts in a transmission of this nature, and to keep such parts accurately correlated for cooperating efficiently and with greater protection against accidental disturbance or impairment.

A further object is to provide anti-frictional means for restricting broadside play between a plate-like member and a yoke arm pivotally coupled thereto in a manner to permit uncramped relative movement between said member and yoke.

The foregoing and other objects of the present improvements will become clear in greater particular from the following description of a preferred embodiment of the invention having reference to the accompanying drawings wherein:

Fig. 1 is a front view of the dial head unit of an automatic weighing scale supported on a hollow standard whose front wall is removed to expose an interior system of levers and linkage in which is incorporated the present improvements.

Fig. 2 is a plan view taken in section on the plane 2—2 in Fig. 1.

Fig. 3 is a fragmentary enlarged view looking in the direction of the arrows from the plane 3—3 in Fig. 2.

Fig. 4 is a still further enlarged fragmentary view of certain parts appearing in Fig. 3 taken partially in section on the plane 4—4 in Fig. 5, looking in the direction of the arrows.

Fig. 5 is a view taken partially in section on the plane 5—5 in Fig. 4 looking in the direction of the arrows.

Fig. 6 is an elevation drawn on the same scale as Fig. 5 looking from left to right at Fig. 3.

Fig. 7 is a plan view looking downward on Fig. 4 taken partially in section on plane 7—7 in the latter figure.

Fig. 8 is a view like Fig. 7 showing a modification.

Fig. 9 is a view like Fig. 4 showing the construction modified to accord with Fig. 8.

Fig. 10 is a view corresponding to Fig. 4 showing the parts at the left end of Fig. 3 taken partially in section on the plane 10—10 in Fig. 6 looking in the direction of the arrows.

The complete apparatus of Figs. 1 and 2 comprises means to counterbalance and measure the force of torque transmitted to the apparatus by a torque arm 19. This arm will be understood to be fixedly carried in the usual manner by the rotatably mounted field frame of a dynamoelectric machine (not shown) which frame tends to turn in the direction of rotation of the armature of such machine except as resisted by one or the other of floating bearing blocks 11 or 12 which receive the thrust of knife edges 13 or 14, respectively. These knife edges are carried at opposite ends of a terminal plate 35 clamped fixedly against the extreme end of torque arm 19 by bolts 36. A conventional type of dynamoelectric machine which may be used in this connection is disclosed in greater detail in my copending application Serial No. 323,569 filed March 12, 1940, wherein arm 19 and plate 35 are identified by corresponding reference numerals. From the aforesaid copending application it will be understood that the shaft of an engine, motor, or other prime mover whose horsepower is to be measured, is coupled impellingly to the armature shaft of the before mentioned dynamoelectric machine so as to rotate said armature while the engine or motor is running. The work thus produced is absorbed through the medium of electrical energy produced by the dynamoelectric machine and a resultant torque force is exerted by arm 19 upward or downward depending on the direction of armature rotation.

Bearing block 11 is freely rotatable on a pivot pin 20. This pin spans the space between arms 21 of the up-action yoke or shackle 22 and has its ends supported in the latter and is retained by cotter pins 23 or the like. Bearing block 12 is freely rotatable on a similar pivot pin 24. This pin spans the space between arms 25 of the down-action yoke or shackle 26 and has its ends supported in the latter and is retained by cotter pins 27 or the like. Each face of each end portion of plate 35 above its knife edges 13 and 14 is, according to these improvements, equipped with boss-like projecting abutment or thrust block 30 which if made as a separately attached part may be steadied in relation to plate 35 by dowels 31 and clamped firmly against such plate by a holding bolt 32. The head of such bolt may contain a socket to accommodate a wrench, instead of a slot to take a screw driver. Each vertical edge of each thrust block 30 falls tangent to the largest periphery of the cone-shaped head 33 of a guide stud 34 whose pointed end may contact with that face of plate 35 against which thrust block 30 is secured. Each guide stud 34 is shouldered thereby to seat against the inner surface of shackle arm 21 or 25 and is drawn tightly against such arm by a nut 37 on the threaded end portion of a shank 38 of the guide stud. Shank 38 is of reduced diameter and passes through a hole in the shackle arm. Each pair of coaxially aligned guide studs 34 have their opposed head points spaced apart sufficiently to permit free vertical movement of plate 35 therebetween without binding, but they afford very little clearance for said plate and therefore the two pairs of these studs carried by each shackle maintain the shackle nicely aligned with the knife edge on the terminal plate so that the bearing blocks may have a perfectly flat, hardened, horizontal top surface contacted by its cooperative knife edge with greater freedom from friction, wear, and liability to derangement or irregularity in operation than if the knife edge seated in a groove.

Two vertical coupling rods 40, 41 depend respectively from the shackles 22 and 26 and have top ends 42, 43 of reduced diameter in threaded engagement with said shackles, respectively, and locked against turning relative thereto by nuts 44, 45. Coupling rods 40 and 41 have similar bottom ends 46, 47 of reduced diameter which are in threaded engagement respectively with two downward directed shackles 48 and 49. Spaced arms of shackles 48, and 49 carry pivot pins 50 and 51 on which bearing blocks 52 and 53 are respectively mounted and free to turn.

Bearing block 52 contacts with a knife-edge 58 and bearing block 53 contacts with a knife-edge 59, both of which knife edges are fixedly mounted on the same direction converting lever 60 at exactly equal distances from the fulcrum thereof. As herein shown, this fulcrum may include ball bearings 62 affording pivotal support for the fulcrum shaft 63 and lodged respectively in the upstanding spaced arms of a stationary bearing bracket 64 which is fixedly secured on the base plate 66 of a hollow column or standard 68 by bolts 67. This column or standard includes framework which supports at its top a dial head unit designated as a whole by 69. This unit may be constructed as illustrated and described in the U. S. Patent No. 2,083,413, granted June 8, 1937, to Glenn E. Weist.

As best shown in Figs. 1, 2 and 5, the aforesaid direction converting lever 60 is bifurcate, providing a central opening spanned by fixedly carried knife-edges 58, 59 and accommodating the shackles 48 and 49. This lever also has a forked terminal portion 73, the space between whose arms is spanned by a knife-edge 74 fixed in the lever. Said space accommodates a bearing pan 75 which is engaged by knife edge 74 and is carried by a lower clevis 76 suspended from a link 77 which is coupled to an upper clevis 78 provided with the inverted bearing pan 79.

Bearing pan 79 rests rockably upon a knife-edge 83 carried by a duplex shelf lever 85 which is rockably seated at 88 on frame carried spaced fulcrum blocks 89. Shelf lever 85 is pivotally coupled at 94 to clevis yoke 95 which together with hook link 97 and its top clevis 98 serves to couple shelf lever 85 pivotally to a force reducing lever 103 at knife edge 104 which supports bearing pan 99 of clevis 98. Lever 103 is rockably seated at 105 on suitable fulcrum blocks stationed atop the U-shaped frame bracket 106.

In addition to the reducing lever 103, the hollow standard 68 contains the conventional tare lever 111 rockably supported on a frame fulcrum 112. A conventional form of universal coupling link 114 may connect reducing lever 103 with tare lever 111. Tare lever 111 is operatively connected in conventional form by means of coupling yoke 119 and draft rod 120 with a pendulum type of automatic load counterbalancing and measuring mechanism in the dial head unit 69.

Complete details of this dial head unit are more thoroughly set forth in the before mentioned Patent No. 2,013,483, granted to G. E. Weist. It will suffice to mention here that as in the case of my hereinbefore mentioned copending application, Serial No. 323,569, the dial head unit includes load force counterbalancing pendulums 123 whose swinging movements about frame pivots 124 are converted into rotary movement of the indicator pointer 125 so that the latter sweeps over a scale of force magnitude indicating graduations 126 shown in Fig. 1. The tare lever 111 may carry by means of arms 121 one or more graduated tare beams 122 equipped with slidable poises such as 127.

In operation it will be understood that torque arm 19 is mounted to swing about an axis displaced a considerable distance horizontally to the rear of the force exerting end of this arm in Figs. 1 and 2. Actually, it performs only a very small increment of movement which movement in Fig. 1 will be either upward or downward and practically in a vertical direction. When torque arm 19 tends to move downward it causes knife-edge 14 to depress bearing block 12 and coupling rod 41 and hence swing lever 60 clockwise about its fulcrum 62. This draws downward on the linkage 76, 77, 78 with a reduction of force owing to the knife-edge 74 having a greater lever arm with respect to fulcrum 62 than has knife-edge 59. Hence a once reduced force is thus imparted to the duplex shelf lever 85 urging the latter counterclockwise or downward about its fulcrum 89. Consequently shelf lever 85 pulls downward through the linkage 95, 97, 98 on the force reducing lever 103. But up to this point a second reduction of force has been effected because knife edge 94 has a greater lever arm with respect to fulcrum 89 than has knife-edge 83. The consequent downward pull on force reducing lever 103 urges the latter clockwise about its fulcrum 106 so that through linkage 114 the tare lever 111 is urged counterclockwise about its fulcrum 112 by a still further diminished force. This thirdly reduced force as imparted to tare lever 111 acts through linkage 119, 120 to lift the pendulums 123 of the automatic load counterbalancing mechanism of the dial head unit whose force indicating pointer 125 sweeps over a scale of graduations 126 to register the force exerted by torque arm 19.

When the torque arm exerts an upward instead of a downward pressure, this force instead of being resisted by bearing block 12 will be resisted by bearing block 11 seated on knife-edge 13. Through this medium, coupling rod 40 will be pulled upward and will act on knife-edge 58 to impart clockwise movement to direction reversing lever 60, just as in the case of the downward thrust on coupling rod 41, whereby the force exerted upward by torque 19 will be reduced only by lever 60, again by lever 85, and still again by lever 103 before being transmitted to the tare lever 111, all as described in the foregoing.

The restriction of broadside play between plate 35 and yoke arms 21 or 25 provided by studs 34, of which there are two spaced crosswise of the line of movement on each side of each end of plate 35, makes it possible to provide bearing blocks 11 and 12 with entirely plain flat surfaces omitting the usual V-groove therein for seating the knife-edges. This decreases friction and liability to defects in manufacture and increases wearing qualities and damage from jarring. Restriction of play will be observed to be effective also endwise of plate 35 because of the engagement of the narrowed circular edge of stud heads 33 with thrust blocks 30 and is effective laterally of plate 35 because of the engagement of the pointed ends of the stud heads 30 with the front and rear faces of plate 35. Enough clearance is provided between these stud heads and the constrained portions of the plate 35, including thrust blocks 30, to permit the latter to move in unison with bearing blocks 11 and 12 upward and downward entirely free of cramping or appreciable frictional resistance despite the small relative movement which must take place between plate 35 and yokes 22, 26.

As shown in Figs. 8 and 9, I may omit one of the thrust blocks 30 and both of the studs 34 shown to cooperate therewith in Fig. 7 and in the place of such thrust block and studs I may place a single stud 128 like 34 preferably central of the distance between the remaining pair of studs 34, or in other words with its pointed head 33 in position to contact with the face of plate 35 at a point centrally opposite the remaining thrust block 30. This would afford 3-point instead of 4-point facewise constraint and impose upon only two studs and one thrust block the duty of edgewise constraint between plate 35 and either shackle 22 or 26.

The general organization of interconnected weighing levers and linkage contained in cabinet 68 and operatively associated with the mechanism of Figs. 3 to 9 of the drawings herein is claimed in my aforesaid parent application Serial No. 370,097.

The appended claims will be understood as contemplating and intending to cover all substitutes and equivalents for the particular shapes and arrangements of parts herein disclosed to illustrate a successfully workable form of the invention.

I claim:

1. In a force measuring instrument including mutually reactive members movable in approximately vertical directions for transmitting a measurable force, antifrictional play restricting devices for checking relative movement of at least one of said members in vagrant directions, including the combination with said members of, a force transmitting knife-edge and carrier therefor on one of said members, a reactive force transmitting seat and carrier therefor on the other of said members said seat having a substantially horizontal line of seating contact with said knife edge and further having a table surface bordering said knife edge affording clearance for said carriers to rock relatively about said line of seating contact, and a plurality of nose-like projections rigid with one of said members displaced from a horizontal plane containing said line of seating contact and pointing horizontally in opposite directions crosswise said line of contact toward the carrier on the other of said members for engaging therewith in a manner to restrict play between said members in directions crosswise said knife edge.

2. In a force measuring instrument, the combination of, reactive members movable in approximately vertical directions for transmitting a measurable force, a force transmitting knife-edge and carrier therefor on one of said members having lateral thrust surfaces disposed in substantially vertical planes paralleling the knife edge of said carrier, a reactive force transmitting seat and carrier therefor on the other of said members said seat having a substantially horizontal line of seating contact with said knife edge and further having a table surface bordering said knife edge affording clearance for said carriers to rock relatively about said line of seating contact, and a plurality of nose-like projections rigid with said other member displaced from a horizontal plane containing said line of seating contact and disposed to engage respectively and slidably at times with said lateral thrust surfaces of said knife edge carrier, whereby movement of each of said carriers relative to the other in vagrant directions crosswise said knife edge is checked without impeding member movement for transmitting said measurable force.

3. In a force measuring instrument, antifrictional play restricting devices as defined in claim 1, together with a thrust abutment on one of the said members positioned to engage with the side of one of the said nose-like projections in a manner to check relative movement of said members in a horizontal direction parallel to the said straight line of seating contact of the said knife edge carrier with the said seat carrier.

4. In a force measuring instrument, the combination defined in claim 2, together with a thrust abutment on one of the said members positioned to engage with the side of one of the said nose-like projections in a manner to check relative movement of said members in a horizontal direction parallel to the said straight line of seating contact of the said knife edge carrier and the said seat carrier.

5. In a force measuring instrument, the combination of, reactive members movable in approximately vertical directions for transmitting a measurable force, a force transmitting knife-edge carrier on one of said members having lateral thrust surfaces disposed in substantially vertical planes paralleling the knife-edge of said carrier, a reactive force transmitting seat carrier on the other of said members having a substantially horizontal straight line of seating contact with said knife-edge and having a table surface bordering said knife-edge affording clearance for said carriers to rock relatively about said line of seating contact, and a plurality of nose-like projections at each side of said knife-edge carrier rigid with said other member and displaced from a horizontal plane containing said line of seating contact and disposed to contact slidably with each of said lateral thrust surfaces of said knife-edge carrier whereby movement of each of said carriers relative to the other in vagrant directions crosswise said knife edge is checked without impeding member movement for transmitting said measurable force.

6. In a force measuring instrument, the combination of, reactive members movable in approximately vertical directions for transmitting a measurable force, a force transmitting knife-edge carrier on one of said members having lateral thrust surfaces disposed in substantially vertical planes paralleling the knife-edge of said carrier, a reactive force transmitting seat carrier on the other of said members having a substantially horizontal straight line of seating contact with said knife-edge and having a table surface bordering said knife-edge affording clearance for said carriers to rock relatively about said line of seating contact, and three nose-like projections rigid with said other member displaced from a horizontal plane containing said line of seating contact, two of said projections being at one side of said knife-edge carrier and disposed to engage slidably with one of said lateral thrust surfaces and the remaining projection being at the opposite side of said knife-edge carrier and disposed to engage slidably at times with the other of said lateral thrust surfaces whereby movement of each of said carriers relative to the other in vagrant directions crosswise said knife edge is checked without impeding member movement for transmitting said measurable force.

7. In a force measuring instrument including relatively movable cooperative members for transmitting said force, anti-frictional bearing construction for restricting play and maintaining designed alignment between said members, including the combination with a force transmitting plate-like member carrying a knife-edge, of a force transmitting block-like member having a linear extent of rocking contact with said knife-edge, a yoke having spaced arms straddling said block-like member and pivotally carrying the latter therebetween, and a plurality of thrust receptive play restricting stud-like projections on said arms terminating in sufficient proximity to opposite faces of said plate-like member to restrict broadside play between the latter and said yoke arms.

8. In a force measuring instrument including relatively movable cooperative members for transmitting said force, anti-frictional bearing construction for restricting play and maintaining designed alignment between said members, including the combination with a force transmitting plate-like member carrying a knife-edge, of a force transmitting block-like member having a linear extent of rocking contact with said knife edge, a yoke having spaced arms straddling and flanking said block-like member and pivotally carrying the latter therebetween, and a plurality of thrust receptive play restricting stud-like projections on said arms having pointed heads terminating in sufficient proximity to opposite faces of said plate-like member to restrict broadside play between the latter and said flanking yoke arms.

9. In a force measuring instrument including relatively movable cooperative members for transmitting said force, anti-frictional bearing construction for restricting play and maintaining designed alignment between said members, including the combination with a force transmitting plate-like member carrying a knife-edge, of a force transmitting block-like member having a linear extent of rocking contact with said knife-edge, a yoke having spaced arms straddling said block-like member and pivotally carrying the latter therebetween, and a plurality of thrust receptive play restricting stud-like projections carried by at least one of said arms spaced apart lengthwise of said knife-edge and terminating in sufficient proximity to a common face of said plate-like member to restrict broadside play between the latter and one of said yoke arms.

10. In a force measuring instrument including relatively movable cooperative members for transmitting said force, anti-frictional bearing construction for restricting play and maintaining designed alignment between said members, including the combination with a force transmitting plate-like member carrying a knife-edge, of a force transmitting block-like member having a linear extent of rocking contact with said knife-edge, a yoke having spaced arms straddling said block-like member and pivotally carrying the latter therebetween, and at least two thrust receptive play restricting stud-like projections carried by each of said arms spaced apart lengthwise of said knife edge and terminating in sufficient proximity to opposite faces of said plate-like member to restrict broadside play between the latter and said yoke arms.

11. In a force measuring instrument including relatively movable cooperative members for transmitting force, anti-frictional bearing construction for restricting play and maintaining desired alignment between said members, including the combination with a force transmitting plate-like member carrying a knife-edge, of at least one thrust abutment projecting from a lateral face of said plate-like member, a force transmitting block-like member having a linear extent of rocking contact with said knife edge, a yoke having spaced arms straddling said block-like member and pivotally carrying the latter therebetween, and at least two play restricting stud-like projections carried by at least one of said arms and spaced apart lengthwise of said knife-edge in positions to be engaged by opposite edges respectively of said thrust abutment in a manner to restrict endwise play of said plate-like member relative to said yoke arms.

12. In a force measuring instrument including relatively movable cooperative members for transmitting force, anti-frictional bearing construction for restricting play and maintaining designed alignment between said members, including the combination with a force transmitting plate-like member carrying a knife-edge, of at least one thrust abutment projecting laterally from said plate-like member, a force transmitting block-like member having a linear extent of rocking contact with said knife edge, a yoke having spaced arms straddling said block-like member and pivotally carrying the latter therebetween, and at least two play restricting stud-like projections carried by said arms in position to engage edgewise with a thrust abutment and terminating in proximity to respectively opposite faces of said plate-like member thereby to restrict both edgewise and broadside play of the latter relative to said yoke arms.

13. In scale mechanism, knife-edge bearing construction embodying in combination with a force transmissive member carrying a knife-edge, a coupling yoke having spaced arms, a bearing block pivotally carried by said yoke between said arms presenting a plain flat face to be contacted by said knife-edge, and means carried fixedly by said arms flanking said force transmissive member in a manner to keep said knife-edge and said bearing block in constant relative alignment with sufficient play to permit uncramped relative movement between said transmissive member and said yoke arms.

14. In a force measuring instrument including cooperative members movable relatively for transmitting said force, anti-frictional thrust bearing construction for restricting play and maintaining designed alignment between said members, including the combination of, a force transmitting knife edge, a structure carrying said knife-edge presenting thrust surfaces disposed to rock broadside with said structure, a force transmitting member having a plane flat face bearing rockably against said knife edge, a yoke pivotally carrying said member having spaced arms straddling the latter, and play restricting stud-like projections mounted on said arms terminating in sufficient proximity to said thrust surfaces thereby to restrict broadside play between said member and said yoke arms.

OSWALD S. CARLISS.